US009266288B2

(12) United States Patent
Okamura

(10) Patent No.: US 9,266,288 B2
(45) Date of Patent: Feb. 23, 2016

(54) THREE-DIMENSIONAL PRINTING APPARATUS

(71) Applicant: Roland DG Corporation, Hamamatsu-shi, Shizuoka (JP)

(72) Inventor: Yoshimasa Okamura, Hamamatsu (JP)

(73) Assignee: ROLAND DG CORPORATION, Shizuoka (JP)

(*) Notice: Subject to any disclaimer, the term of this patent is extended or adjusted under 35 U.S.C. 154(b) by 0 days.

(21) Appl. No.: 14/511,245

(22) Filed: Oct. 10, 2014

(65) Prior Publication Data

US 2015/0110912 A1    Apr. 23, 2015

(30) Foreign Application Priority Data

Oct. 18, 2013    (JP) ................. 2013-217267

(51) Int. Cl.
*B29C 67/00*    (2006.01)
*B33Y 30/00*    (2015.01)
*B33Y 50/02*    (2015.01)
*B29K 101/12*   (2006.01)

(52) U.S. Cl.
CPC ......... *B29C 67/0088* (2013.01); *B29C 67/0055* (2013.01); *B33Y 30/00* (2014.12); *B33Y 50/02* (2014.12); *B29K 2101/12* (2013.01)

(58) Field of Classification Search
USPC ....................................................... 425/162
See application file for complete search history.

(56) References Cited

U.S. PATENT DOCUMENTS

| 7,950,131 B2 * | 5/2011 | Hilliard ........................... 29/564 |
| 2012/0251688 A1 * | 10/2012 | Zimmerman et al. ........ 426/383 |
| 2013/0234370 A1 * | 9/2013 | Suzuki et al. ................. 264/401 |

FOREIGN PATENT DOCUMENTS

JP    06-98689 B2    12/1994

* cited by examiner

*Primary Examiner* — Jacob Thomas Minskey
(74) *Attorney, Agent, or Firm* — Keating and Bennett, LLP

(57) ABSTRACT

A three-dimensional printing apparatus includes a shaping head to discharge a resin material, a table to retain the discharged resin material, a carriage mechanism fitted to the shaping head and moving the shaping head relative to the table, a rotatable member disposed outward of the table, a first horizontal rotary shaft rotatably supporting the table, a first motor to rotate the first horizontal rotary shaft, a second horizontal rotary shaft fitted to the rotatable member and extending in a direction perpendicular or substantially perpendicular to the first horizontal rotary shaft, a second motor to rotate the second horizontal rotary shaft so as to rotate the table, the first horizontal rotary shaft, and the first motor, along with the rotatable member, around the second horizontal rotary shaft, and a microcomputer configured or programmed to control the shaping head, the first motor, and the second motor.

5 Claims, 5 Drawing Sheets

THREE-DIMENSIONAL PRINTING APPARATUS

The present application claims priority from Japanese Patent Application No. 2013-217267, filed on Oct. 18, 2013, which is incorporated by reference herein in its entirety.

BACKGROUND OF THE INVENTION

1. Field of the Invention

The present invention relates to a three-dimensional printing apparatus.

2. Description of the Related Art

A three-dimensional printing apparatus for shaping a three-dimensional printed object by successively stacking layers of a resin material each having a predetermined cross-sectional shape and curing the resin material is conventionally known. For example, JP H6(1994)-98689 B discloses a technique of forming a three-dimensional printed object by discharging a photo-curable resin from a shaping head and curing the photo-curable resin based on three-dimensional data that represent the shape of the three-dimensional object to be manufactured.

In the present description, the term "three-dimensional data" refers to data of a plurality of cross-sectional images created from a three-dimensional model representing the shape of a three-dimensional object or a three-dimensional printed object to be manufactured.

This type of three-dimensional printing apparatus includes a shaping head for discharging a resin material, and a table for retaining the discharged resin material. Layers of the resin material are successively stacked on the table. The shaping head and the table are configured to be movable relative to each other. As the shaping head moves relative to the table while discharging the resin material, a layer of the resin material having a predetermined cross-sectional shape is stacked on the table or on a layer of the resin material that has been already cured.

The layers of the resin material are stacked upwardly. For this reason, when the three-dimensional printed object to be manufactured has an arch-shaped configuration, the three-dimensional printed object results in a bent shape due to the weight of the resin material itself. In view of this problem, it is necessary to shape support members 110 for supporting a three-dimensional printed object 100 so that the arch-shaped configuration does not collapse while shaping the three-dimensional printed object.

However, the support members 110 are unnecessary for the three-dimensional printed object 100 after having been completed. The support members 110 need to be removed after the three-dimensional printed object 100 has been shaped. Thus, the conventional three-dimensional printing apparatus requires a process of removing the support members 110 and also results in waste of the resin material.

SUMMARY OF THE INVENTION

Preferred embodiments of the present invention provide a three-dimensional printing apparatus that eliminate or reduce the support members used in shaping a three-dimensional printed object to inhibit or prevent waste of the resin material.

A three-dimensional printing apparatus according to a preferred embodiment of the present invention is a three-dimensional printing apparatus for shaping an object by curing a resin material and successively stacking layers of the resin material each having a predetermined cross-sectional shape, the apparatus including a shaping head configured to discharge the resin material; a table configured to retain the resin material discharged from the shaping head; a carriage mechanism configured to carry the shaping head and move the shaping head relative to the table; a rotatable member disposed outward of the table and including a through-hole provided therein; a first horizontal rotary shaft configured to pass through the through-hole and rotatably support the table; a first motor configured to rotate the first horizontal rotary shaft; a second horizontal rotary shaft fitted to the rotatable member and extending in a direction perpendicular or substantially perpendicular to the first horizontal rotary shaft; a second motor configured to rotate the second horizontal rotary shaft so as to rotate the table, the first horizontal rotary shaft, and the first motor, along with the rotatable member, around the second horizontal rotary shaft; and a control device configured or programmed to control the shaping head, the first motor, and the second motor.

The three-dimensional printing apparatus according to a preferred embodiment of the present invention makes it possible to tilt the table leftward or rightward and also frontward or rearward by rotating the first horizontal rotary shaft and the second horizontal rotary shaft. By rotating the first horizontal rotary shaft and the second horizontal rotary shaft, the table is rotated, for example, around the X-axis or around the Y-axis. This makes it possible to shape a three-dimensional printed object in an arch-shaped configuration without forming the support members when shaping the three-dimensional printed object based on three-dimensional data. As a result, the support members used in shaping the three-dimensional printed object are reduced, and also the process of removing the support members is eliminated. Thus, the printing cost of the three-dimensional printed object is significantly reduced.

In another preferred embodiment of the present invention, the resin material may be a thermoplastic resin, and the shaping head may be provided with a heater configured to heat the thermoplastic resin.

In another preferred embodiment of the present invention, the resin material is a photo-curable resin, and the three-dimensional printing apparatus further includes a lighting device at least including a light source configured to emit light, configured to apply light to the photo-curable resin discharged from the shaping head.

In another preferred embodiment of the present invention, the lighting device is fitted to the shaping head.

This preferred embodiment allows the structure of the three-dimensional printing apparatus to be simpler than in the case where the lighting device is provided separately from the shaping head.

When there exists a three-dimensional object to be shaped by a three-dimensional printing apparatus, the three-dimensional object can be easily shaped by scanning the three-dimensional object with a scanner and using three-dimensional data that are acquired by the scanner, which represent the surface shape of the three-dimensional object.

In other words, the three-dimensional data used in the three-dimensional printing apparatus are created by a scanner that is provided separately from the three-dimensional printing apparatus. The created three-dimensional data are input into the three-dimensional printing apparatus before shaping a three-dimensional printed object. Thus, it has been necessary to use a scanner for creating the three-dimensional data representing the surface shape of the three-dimensional printed object to be shaped, in addition to the three-dimensional printing apparatus for actually shaping the three-dimensional printed object.

However, in the just-mentioned technique, it is necessary to provide a scanner in addition to the three-dimensional printing apparatus, which increases the cost for producing the three-dimensional printed object, especially when the production is in a small volume. For this reason, it is desired to create the three-dimensional data within the three-dimensional printing apparatus, without using a scanner that is provided separately from the three-dimensional printing apparatus.

In another preferred embodiment of the present invention, a three-dimensional printing apparatus that further includes a scan head configured to be movable relative to the table and detect a surface shape of a predetermined three-dimensional object disposed on the table, wherein the control device is configured or programmed to control the shaping head, the first motor, and the second motor based on three-dimensional data representing the surface shape of the three-dimensional object detected by the scan head.

With this preferred embodiment, the table is configured to be tilted frontward and rearward, as well as leftward and rightward, by rotating the first horizontal rotary shaft and the second horizontal rotary shaft. Therefore, when detecting the surface shape of a predetermined three-dimensional object, the three-dimensional object is capable of being detected from various angles. As a result, the entire surface shape of the three-dimensional object is capable of being detected. Thus, a three-dimensional printed object is preferably shaped without separately providing a scanner for detecting the surface shape of a three-dimensional object.

In another preferred embodiment of the present invention, the scan head is fitted to the carriage mechanism, and the shaping head and the scan head move integrally with each other.

In the just-mentioned preferred embodiment, the cost is significantly reduced because the structure of the three-dimensional printing apparatus is made simpler than in the case where the shaping head and the scan head move independently from each other and also because it is unnecessary to provide different carriage mechanisms for the shaping head and the scan head.

Various preferred embodiments of the present invention may be as described in the foregoing. Therefore, various preferred embodiments of the present invention achieve a significant advantageous effect that a three-dimensional printed object is shaped without using support members.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

First Preferred Embodiment

Figure 1:
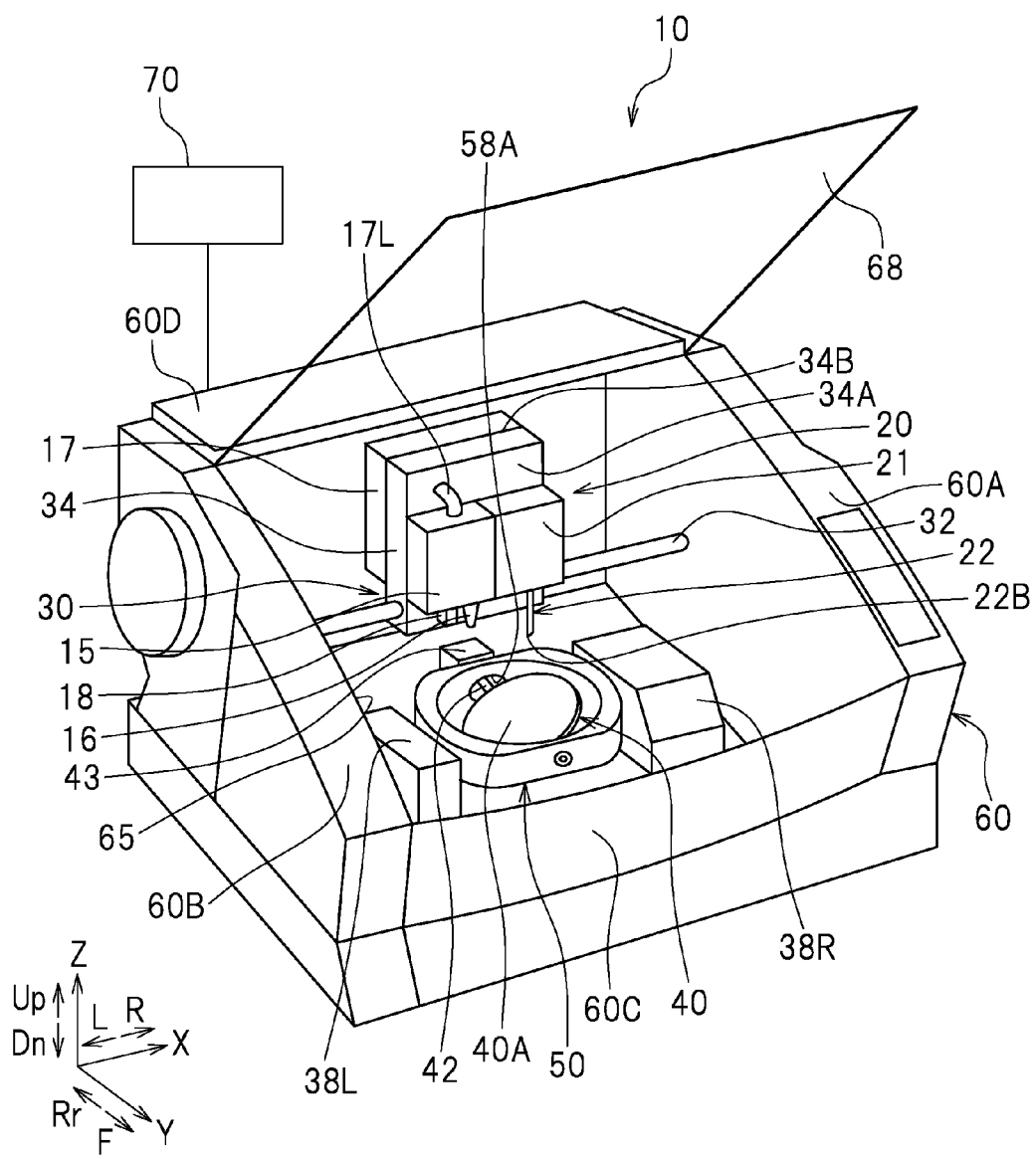
FIG. 1 is a perspective view illustrating a structure of a three-dimensional printing apparatus according to a preferred embodiment of the present invention.

Hereinbelow, various preferred embodiments of the present invention will be described with reference to the drawings. As illustrated in FIG. 1, a three-dimensional printing apparatus 10 according to the present preferred embodiment three-dimensionally shapes an object by curing a resin material and successively stacking layers of the resin each having a predetermined cross-sectional shape. In the following description, a photo-curable resin is preferably used as an example of the resin material, but this is not intended to limit the applications of the present invention to such a type of resin material.

Figure 2:
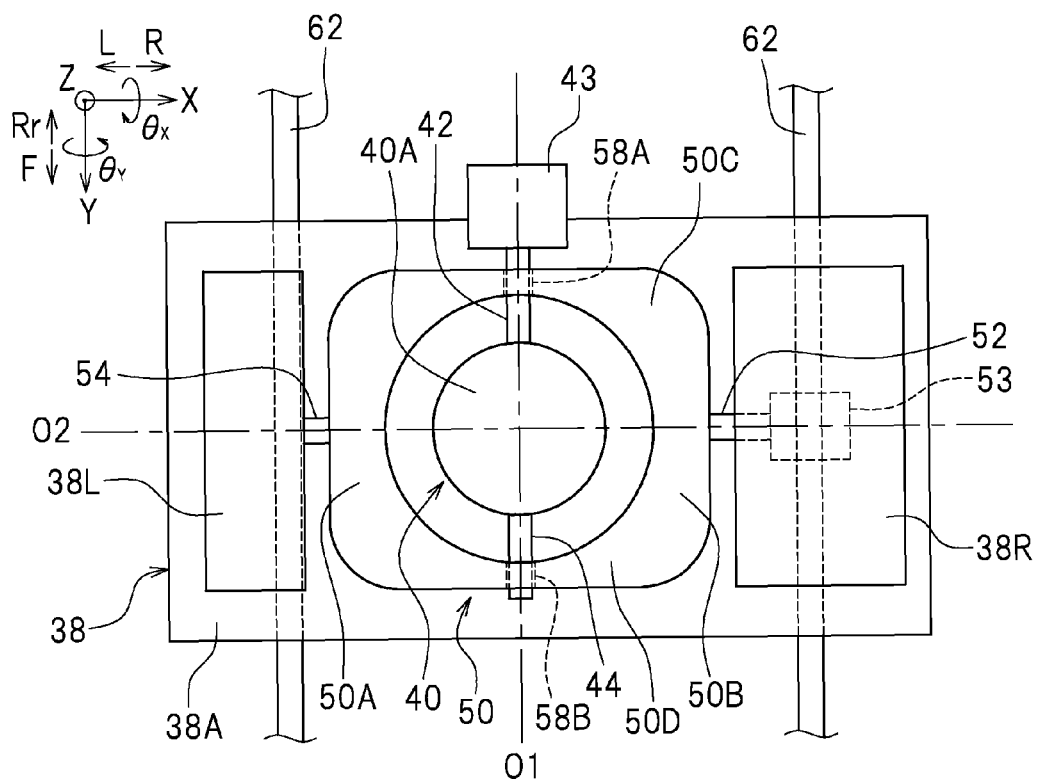
FIG. 2 is a plan view illustrating the structure around a table according to a preferred embodiment of the present invention.

In the following description, the left, the right, the top, and the bottom of FIG. 2 represent the left, the right, the rear, and the front of the three-dimensional printing apparatus 10, respectively, unless specifically indicated otherwise. Reference characters F, Rr, L, R, Up, and Dn in the drawings indicate front, rear, left, right, up, and down, respectively. Reference character X in the drawings indicates the X-axis and represents leftward and rightward directions. Reference character Y in the drawings indicates the Y-axis and represents frontward and rearward directions. Reference character Z in the drawings indicates the Z-axis and represents upward and downward directions. Reference characters $\theta_X$ and $\theta_Y$ represent the directions of rotation around the X-axis and the Y-axis, respectively. In the present preferred embodiment, the X-axis, the Y-axis, and the Z-axis are preferably set such that one of the axes is perpendicular or substantially perpendicular to the other two axes. However, it is sufficient that the X-axis, the Y-axis, and the Z-axis may be set such that one of the axes crosses the other two axes. These directional terms are merely provided for purposes in illustration and are not intended to limit the preferred embodiments of the three-dimensional printing apparatus 10 in any way.

As illustrated in FIG. 1, the three-dimensional printing apparatus 10 preferably includes a shaping head 15, a scan head 20, a carriage mechanism 30, a table 40, a rotatable member 50, a main unit case 60, and a microcomputer 70.

The overall operation of the three-dimensional printing apparatus 10 is controlled by the microcomputer 70 as a control device. The microcomputer 70 creates three-dimensional data representing the surface shape of a three-dimensional object based on the information acquired by the scan head 20.

The main unit case 60 includes a right side wall 60A, a left side wall 60B, a bottom wall 60C and a rear wall 60D. The main unit case 60 includes an opening 65 from the upper side thereof to the front side thereof. The main unit case 60 is provided with a cover 68 configured to cover the opening 65. The cover 68 is preferably a transparent member. The cover can be opened and closed. When the cover 68 is opened, the internal space of the main unit case 60 is allowed to communicate with the external space outside the main unit case 60 and is brought into an open state. When the cover 68 is closed, the internal space of the main unit case 60 is isolated from the external space outside the main unit case 60 and is brought into a closed state. The worker can visually ascertain the condition of the shaping inside the main unit case 60 through the cover 68. The cover 68 may be provided so as to be detachable from and reattachable to the main unit case 60.

The cover 68 is opened in order to place a predetermined three-dimensional object on a top surface 40A of the table 40 and to replace a later-described tank 17 configured to store a photo-curable resin. The cover 68 is closed when detecting the surface shape of the predetermined three-dimensional object by the scan head 20 and when shaping a three-dimensional printed object by the shaping head 15.

As illustrated in FIG. 1, the carriage mechanism 30 is disposed in the main unit case 60. The carriage mechanism 30 is controlled by the microcomputer 70. The carriage mechanism 30 includes a guide rail 32 and a carriage member 34. The guide rail 32 extends along a left-right direction. The guide rail 32 extends along the X-axis direction of the XYZ perpendicular or substantially perpendicular coordinate system. The guide rail 32 connects the right side wall 60A and the left side wall 60B to each other. The carriage member 34 is provided movably on the guide rail 32. The carriage member 34 receives the driving force of a motor, which is not shown, and moves in leftward and rightward directions. The carriage member 34 moves leftward and rightward on the X-axis.

The shaping head 15 discharges a resin material. The shaping head 15 is controlled by the microcomputer 70. The shaping head 15 is fitted to the carriage mechanism 30. The shaping head 15 is fitted to the carriage member 34. The shaping head 15 is fitted to a front surface 34A of the carriage member 34. The shaping head 15 is fitted to the carriage member 34 so as to be movable in upward and downward directions. The shaping head 15 is configured to be moved in leftward and rightward directions as well as in upward and downward directions by the carriage mechanism 30. The shaping head 15 is movable relative to the table 40.

The shaping head 15 includes a nozzle 16 configured to discharge a photo-curable resin supplied from the tank 17. The shaping head 15 includes a lighting device 18. The lighting device 18 at least includes a light source configured to emit light. The lighting device 18 applies light to the photo-curable resin discharged from the shaping head 15. The lighting device 18 emits light that cures the photo-curable resin discharged from the shaping head 15. The lighting device 18 is controlled by the microcomputer 70. The lighting device 18 is disposed adjacent to the nozzle 16.

The scan head 20 is configured to detect a surface shape of a predetermined three-dimensional object disposed on the table 40. The scan head 20 is controlled by the microcomputer 70. The scan head 20 is fitted to the carriage mechanism 30. The scan head 20 is fitted to the carriage member 34. The scan head 20 is fitted to the front surface 34A of the carriage member 34. The scan head 20 is fitted to the right of the shaping head 15. The scan head 20 may be fitted to the left of the shaping head 15. The scan head 20 is fitted to the carriage member 34 so as to be movable in upward and downward directions. The scan head 20 can be moved in leftward and rightward directions as well as in upward and downward directions owing to the carriage mechanism 30. The scan head 20 is movable relative to the table 40. In the present preferred embodiment, the scan head 20 and the shaping head 15 preferably move integrally with each other. In the present preferred embodiment, the scan head 20 and the shaping head 15 preferably move integrally with each other in leftward and rightward directions. The scan head 20 and the shaping head 15, however, may move independently from each other.

The scan head 20 includes a main unit 21 and a contact sensor 22. The contact sensor 22 is fitted to the main unit 21 so as to be movable in upward and downward directions. The main unit 21 is fitted to the carriage member 34 so as to be movable in upward and downward directions. When the contact sensor 22 should detect the surface shape of a three-dimensional object disposed on the top surface 40A of the table 40, the contact sensor 22 moves downward so as to protrude from the bottom of the main unit 21. On the other hand, when the contact sensor 22 has finished detecting or does not detect the surface shape of a three-dimensional object disposed on the top surface 40A of the table 40, the contact sensor 22 moves upward so as to be housed in the main unit 21.

For such a scan head 20, it is possible to use known techniques such as disclosed in, for example, JP H11(1999)-173806 A and JP 2001-012942 A, so the detail description thereof will not be given herein.

The three-dimensional printing apparatus 10 has a tank 17. The tank 17 accommodates a photo-curable resin. The tank 17 is replaceable. The tank 17 is fitted to the carriage mechanism 30. The tank 17 is fitted to the carriage member 34. The tank 17 is fitted to a rear surface 34B of the carriage member 34. The tank 17 preferably moves integrally with the shaping head 15.

The three-dimensional printing apparatus 10 includes a resin supply passage 17L. The resin supply passage 17L is connected to the tank 17 and the shaping head 15. The resin supply passage 17L is connected to the nozzle 16. The resin material in the tank 17 is supplied to the shaping head 15 through the resin supply passage 17L. An example of the resin supply passage 17L is a flexible tube. The resin supply passage 17L may be a metallic tube. In the present preferred embodiment, the resin supply passage 17L is disposed through the carriage member 34, but the resin supply passage 17L may be disposed so as to bypass the carriage member 34.

As illustrated in FIG. 2, the three-dimensional printing apparatus 10 (see FIG. 1) includes a pair of guide rails 62 and a base member 38. The guide rails 62 are provided on a bottom wall 60C (see FIG. 1) of the main unit case 60. The guide rails 62 extend along a front-rear direction. The guide rail 62 extends along the Y-axis direction of the XYZ perpendicular or substantially perpendicular coordinate system.

The base member 38 is provided movably on the guide rails 62. The base member 38 moves frontward and rearward along the guide rails 62. The base member 38 is controlled by the microcomputer 70 to move in the Y-axis direction. The base member 38 includes a right wall 38R and a left wall 38L extending upward from a top surface 38A of the base member 38.

As illustrated in FIG. 2, the table 40 is provided in the base member 38. The table 40 is disposed inward of the rotatable member 50. The table 40 is disposed between the right wall 38R and the left wall 38L of the base member 38. The table 40 retains the resin material discharged from the shaping head 15. The resin material discharged from the shaping head 15 is retained on the top surface 40A of the table 40. On the table 40, the resin material discharged from the shaping head 15 is cured, so that a desired three-dimensional printed object is shaped. A predetermined three-dimensional the surface shape of which is to be detected by the scan head 20 is disposed on the table 40.

The predetermined three-dimensional object is fixed to the top surface 40A of the table 40. The table 40 preferably is disk-shaped. A first horizontal rotary shaft 42 is fixed to the table 40. The first horizontal rotary shaft 42 extends in a front-rear direction. The first horizontal rotary shaft 42 rotatably supports the table 40. The first horizontal rotary shaft 42 passes through a through-hole 58A located in a rear portion 50C of the rotatable member 50, and is rotatably supported by the rotatable member 50.

The three-dimensional printing apparatus 10 includes a first motor 43. The first motor 43 is fitted to the first horizontal rotary shaft 42. The first motor 43 is disposed outward of the rotatable member 50. The first horizontal rotary shaft 42 is rotated by the driving force of the first motor 43.

A rotary shaft 44 is fixed to the table 40. The rotary shaft 44 extends in a front-rear direction. The rotary shaft 44 rotatably supports the table 40. The rotary shaft 44 passes through a through-hole 58B located in a front portion 50D of the rotatable member 50, and is rotatably supported by the rotatable member 50. The axial line O1 of the rotary shaft 44 and the axial line O1 of the first horizontal rotary shaft 42 are in agreement with each other. It should be noted that the rotary shaft 44 and the first horizontal rotary shaft 42 may be integral with each other and may be disposed so as to pass through the table 40, for example.

The driving of the first motor 43 is controlled by the microcomputer 70 (see FIG. 1). The table 40 is driven by the first motor 43 so that the table 40 rotates about the axial line O1 of the first horizontal rotary shaft 42 and the rotary shaft 44 around the Y-axis. The rotation angle of the table 40 around the Y-axis is controlled by controlling the driving of the first motor 43.

When the first motor 43 is driven, the first horizontal rotary shaft 42 is rotated, and the table 40, which is supported by the first horizontal rotary shaft 42, is rotated accordingly. When the first horizontal rotary shaft 42 is rotated, the posture of the table 40 is changed. Thus, the three-dimensional printing apparatus 10 is capable of tilting the table 40 leftward or rightward. In other words, the table 40 is configured to be rotated around the Y-axis. It is also possible to turn over the table 40 leftward or rightward.

As illustrated in FIG. 2, the rotatable member 50 is provided in the base member 38. The rotatable member 50 is disposed outward of the table 40. The rotatable member 50 is disposed between the right wall 38R and the left wall 38L of the base member 38. A second horizontal rotary shaft 52 is fixed to a right side portion 50B of the rotatable member 50. The second horizontal rotary shaft 52 extends in a left-right direction. The second horizontal rotary shaft 52 extends in a direction perpendicular or substantially perpendicular to the first horizontal rotary shaft 42. The second horizontal rotary shaft 52 rotatably supports the rotatable member 50. The second horizontal rotary shaft 52 is rotatably supported on the left wall 38L.

The three-dimensional printing apparatus 10 preferably includes a second motor 53. The second motor 53 is fitted to the second horizontal rotary shaft 52. The second motor 53 is disposed in the left wall 38L. The second horizontal rotary shaft 52 is rotated by the driving force of the second motor 53.

A rotary shaft 54 is fixed to a left side portion 50A of the rotatable member 50. The rotary shaft 54 extends in a left-right direction. The rotary shaft 54 rotatably supports the rotatable member 50. The rotary shaft 54 is rotatably supported on the right wall 38R. The axial line O2 of the rotary shaft 54 and the axial line O2 of the second horizontal rotary shaft 52 are in agreement with each other.

The driving of the second motor 53 is controlled by the microcomputer 70 (see FIG. 1). The rotatable member 50 is driven by the second motor 53 so that the rotatable member 50 rotates about the axial line O2 of the second horizontal rotary shaft 52 and the rotary shaft 54 around the X-axis. The rotation angle of the table 40 around the X-axis is controlled by controlling the driving of the second motor 53.

The table 40, the first horizontal rotary shaft 42, the rotary shaft 44, and the first motor 43 are configured to be rotatable around the second horizontal rotary shaft 52 integrally with the rotatable member 50. Therefore, when the second motor 53 is driven and the second horizontal rotary shaft 52 is rotated, the rotatable member 50 and the table 40 rotate integrally with each other, so that the posture of the table 40 is changed. Thus, the three-dimensional printing apparatus 10 is capable of tilting the table 40 frontward or rearward. In other words, the table 40 is configured to be rotated around the X-axis. It is also possible to turn over the table 40 frontward or rearward.

The table 40 and the rotatable member 50 are provided in the base member 38. Therefore, by combining movements of the shaping head 15 and the scan head 20 in leftward and rightward directions (X-axis direction) and upward/downward directions (Z-axis direction of the XYZ perpendicular or substantially perpendicular coordinate system) with movements of the base member 38 in frontward and rearward directions (Y-axis direction), the table 40 is moved relative to the shaping head 15 and the scan head 20 in the X-axis direction, in the Y-axis direction, and in the Z-axis direction, and around the X-axis and around the Y-axis.

Figure 3:
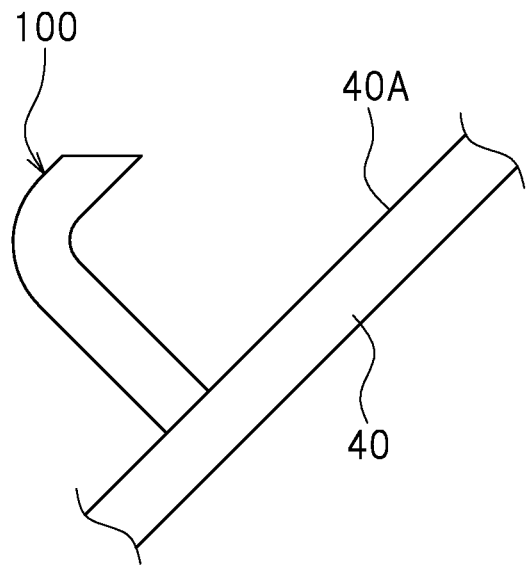
FIG. 3 is a side view illustrating a state in which the table is tilted and a three-dimensional object in an arch-shaped configuration is being formed.
Figure 4:
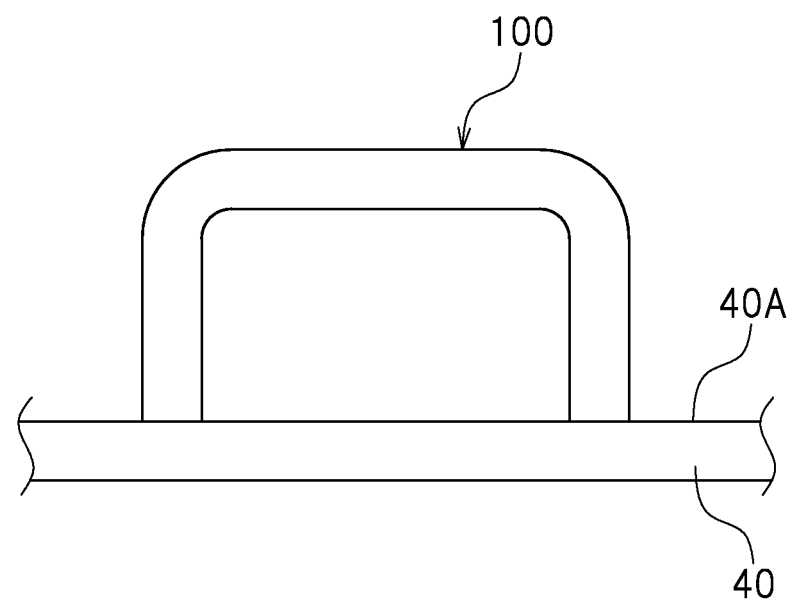
FIG. 4 is a side view illustrating a three-dimensional object in an arch-shaped configuration that has been formed.
Figure 6:
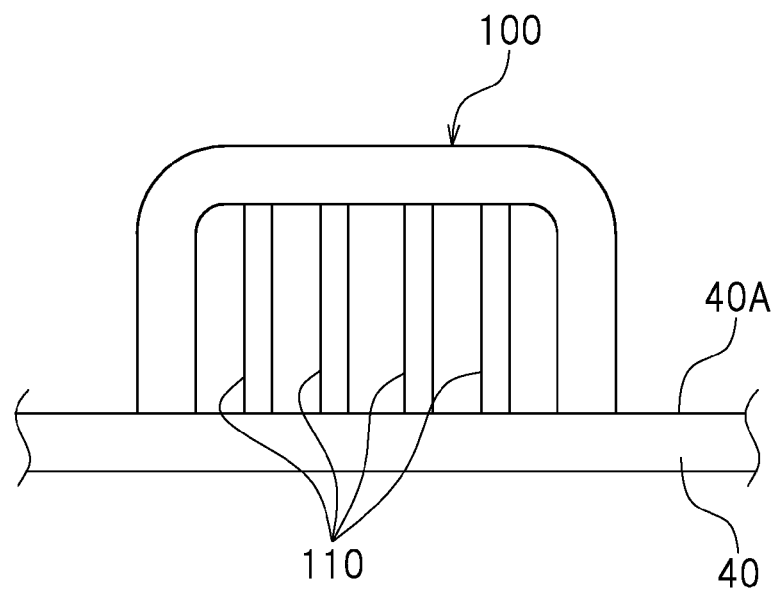
FIG. 6 is a side view illustrating a three-dimensional object in an arch-shaped configuration that has been formed while a support member is formed in a conventional three-dimensional printing apparatus.

As illustrated in FIG. 3, the table 40 is configured to be tilted in the three-dimensional printing apparatus 10. Therefore, by adjusting the tilt angle of the table 40, a three-dimensional printed object in an arch-shape configuration preferably is shaped without forming the support members 110 (see FIG. 6).

Next, the following describes a non-limiting example in which a three-dimensional printed object of a predetermined existing three-dimensional object is to be shaped using the three-dimensional printing apparatus 10.

First, the worker places a predetermined three-dimensional object on the top surface 40A of the table 40, and operates an operating switch or the like, not shown, to instruct the start of creation of three-dimensional data. The three-dimensional object may be placed, for example, using a double-sided adhesive tape.

When the start of creation of three-dimensional data is instructed, the main unit 21 of the scan head 20 moves downward, and the contact sensor 22 also moves downward. Thus, the contact sensor 22 is caused to protrude downward from the main unit 21, as illustrated in FIG. 1.

The microcomputer 70 causes the contact sensor 22 to move so that a lower end 22B of the contact sensor 22 is positioned at a predetermined reference point. Thereafter, while vibrating a vibrating plate (not shown) by applying an alternating current to the contact sensor 22, the lower end 22B of the contact sensor 22 is brought into contact with the three-dimensional object and is moved. As a result, the surface shape of the three-dimensional object is acquired. The acquired surface shape of the three-dimensional object is stored in the microcomputer 70 as the three-dimensional data of the three-dimensional object, i.e., as the three-dimensional data for a three-dimensional printed object.

According to the shape of the three-dimensional object, the table 40 is tilted by rotating the table 40 around the X-axis and around the Y-axis, so that the surface shape of the three-dimensional object is detected.

After the three-dimensional data have been created, the worker instructs the apparatus to start shaping the three-dimensional printed object by operating an operating switch (not shown). The microcomputer 70 controls the shaping head 15, the first motor 43, and the second motor 53 based on the created three-dimensional data. That is, the microcomputer 70 causes the table 40 and the shaping head 15 to move based on the created three-dimensional data, and causes a photo-curable resin to be discharged from the nozzle 16 of the shaping head 15 onto the top surface 40A of the table 40. Then, the microcomputer 70 causes the lighting device 18 to apply light to the discharged photo-curable resin to cure the photo-curable resin. Thus, a three-dimensional printed object is fabricated on the top surface 40A of the table 40. Based on the created three-dimensional data, the microcomputer 70 causes the table 40 to move in a Y-axis direction through the base member 38, and causes the table 40 to rotate around the X-axis and around the Y-axis. This enables to adjust the tilt angle of the table 40 and the relative position of the table 40 relative to the shaping head 15. Based on the created three-dimensional data, the microcomputer 70 causes the carriage member 34 to move in an X-axis direction. Based on the created three-dimensional data, the microcomputer 70 causes the shaping head 15 to move in a Z-axis direction.

In the three-dimensional printing apparatus 10, the shaping head 15 is configured to discharge a photo-curable resin at a desired angle to the top surface 40A of the table 40 or to the photo-curable resin that has been discharged and cured on the top surface 40A of the table 40. Therefore, even when the three-dimensional printed object to be produced is in an arch-shaped configuration, which requires formation of support members, the arch-shaped configuration or the like can be shaped by adjusting the tilt angle of the table 40 without forming the support members. As a result, the amount of the photo-curable resin to be used in shaping the three-dimensional printed object is significantly reduced, and the manufacturing cost of the three-dimensional printed object is significantly reduced accordingly.

Second Preferred Embodiment

The first preferred embodiment has described an example in which a photo-curable resin is preferably used as the resin material. However, the second preferred embodiment describes an example in which a thermoplastic resin is preferably used as the resin material.

Figure 5:
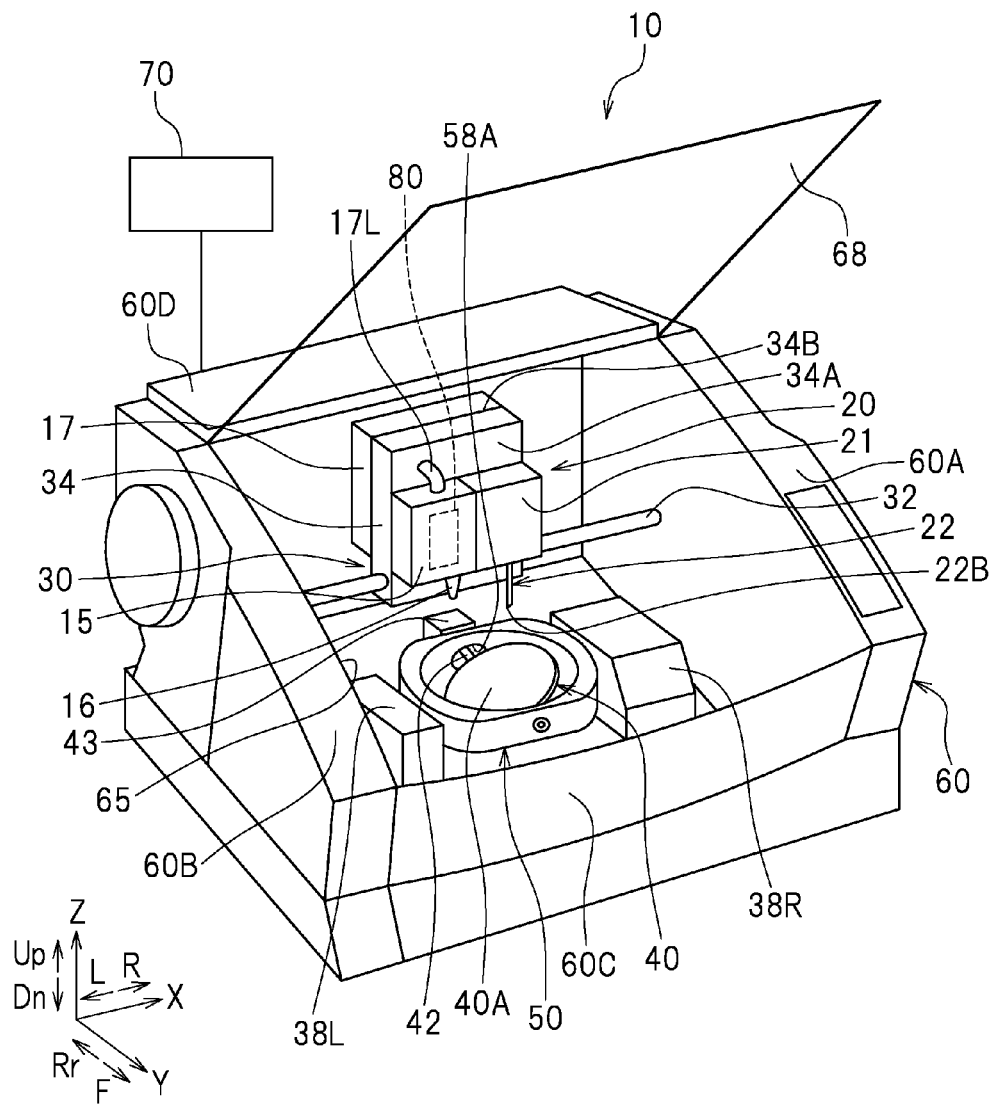
FIG. 5 is a perspective view illustrating the structure of a three-dimensional printing apparatus according to another preferred embodiment of the present invention.

As illustrated in FIG. 5, the shaping head 15 includes a heater 80. The heater 80 is disposed inside the shaping head 15. The heater 80 is disposed so as to surround a resin passage (not shown) disposed inside the shaping head 15. The heater 80 is disposed upstream of the nozzle 16. The heater 80 applies heat to a thermoplastic resin supplied from the tank 17. The tank 17 accommodates the thermoplastic resin.

In a three-dimensional printing apparatus 10 of the present preferred embodiment, the table 40 and the shaping head 15 are moved based on the created three-dimensional data, and the thermoplastic resin is discharged from the nozzle 16 of the shaping head 15 to the top surface 40A of the table 40. The discharged thermoplastic resin is cooled and cured. Thus, a three-dimensional printed object is fabricated on the top surface 40A of the table 40.

As described above, in the three-dimensional printing apparatus 10, the shaping head 15 is fitted to the carriage member 34 that is movable in an X-axis direction, and also, the contact sensor 22 is fitted to the scan head 20 that is disposed movable in a Z-axis direction. This enables the three-dimensional printing apparatus 10 to acquire the surface shape of a predetermined owned three-dimensional object as three-dimensional data using the scan head 20 and to fabricate a three-dimensional printed object based on the acquired three-dimensional data. For this reason, the three-dimensional printing apparatus significantly reduces the cost in comparison with the three-dimensional printing apparatus according to the conventional technique that additionally requires a scanner for creating three-dimensional data.

In addition, the three-dimensional printing apparatus 10 is configured so that the table 40 is disposed movable in a Y-axis direction and that the table 40 is rotatable around the X-axis and around the Y-axis. As a result, the three-dimensional printing apparatus 10 is configured to tilt the table 40 around the X-axis and around the Y-axis. Therefore, even when the three-dimensional printed object to be produced is a shape that cannot be shaped without forming support members, such as an arch-shaped configuration, the three-dimensional printed object is capable of being shaped without forming support members.

The foregoing preferred embodiments may be modified as in the following non-limiting examples (1) through (5).

(1) In the foregoing preferred embodiments, the carriage member 34 preferably is configured to be movable in an X-axis direction and the table 40 is disposed movable in a Y-axis direction, but this is merely illustrative. It is possible that the base member 38 may be fixed to the main unit case 60 and the carriage member 34 may be configured to be movable in an X-axis direction and in a Y-axis direction.

(2) In the foregoing preferred embodiments, the scan head 20 preferably is a contact-type scan head, but this is merely illustrative. The scan head 20 may be a non-contact type scan head that detects the surface shape of the three-dimensional object in a non-contact manner.

(3) In the foregoing preferred embodiments, the three-dimensional printed object is fabricated preferably using the three-dimensional data acquired through the scan head 20, but this is merely illustrative. It is also possible that the three-dimensional data may be created in advance using a personal computer or the like and the three-dimensional data may be input into the microcomputer 70, so that the three-dimensional printed object is shaped based on the three-dimensional data.

(4) In the foregoing preferred embodiments, the shaping head 15 and the scan head 20 preferably are fitted to the carriage member 34, but this is merely illustrative. It is also possible that the shaping head 15 and the scan head 20 may be provided for respective carriage members that move independently from each other.

(5) The foregoing preferred embodiments and the modifications shown in the above examples (1) through (4) may be combined as appropriate.

Various preferred embodiments of the present invention may be suitably applied to a three-dimensional printing apparatus for fabricating three-dimensional printed objects.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A three-dimensional printing apparatus for shaping an object by curing a resin material and successively stacking layers of the resin material each having a predetermined cross-sectional shape, the three-dimensional printing apparatus comprising:
   a shaping head configured to discharge the resin material;
   a table configured to retain the resin material discharged from the shaping head;
   a carriage mechanism configured to carry the shaping head and move the shaping head relative to the table;
   a rotatable member disposed outward of the table and including a through-hole formed therein;
   a first horizontal rotary shaft configured to pass through the through-hole and rotatably support the table;
   a first motor configured to rotate the first horizontal rotary shaft;
   a second horizontal rotary shaft fitted to the rotatable member and extending in a direction perpendicular or substantially perpendicular to the first horizontal rotary shaft;

a second motor configured to rotate the second horizontal rotary shaft so as to rotate the table, the first horizontal rotary shaft, and the first motor, along with the rotatable member, around the second horizontal rotary shaft;

a control device configured or programmed to control the shaping head, the first motor, and the second motor; and a scan head that is configured to be movable relative to the table and detect a surface shape of a predetermined three-dimensional object disposed on the table; wherein the control device is configured or programmed to create three-dimensional data representing the surface shape of the three-dimensional object, based on the surface shape of the three-dimensional object detected by the scan head, and to control the shaping head, the first motor, and the second motor based on the three-dimensional data.

2. The three-dimensional printing apparatus according to claim 1, wherein:

the resin material is a thermoplastic resin; and the shaping head is provided with a heater configured to heat the thermoplastic resin.

3. The three-dimensional printing apparatus according to claim 1, wherein:

the resin material is a photo-curable resin; and the three-dimensional printing apparatus further comprises:

a lighting device including a light source configured to emit light, configured to apply light to the photo-curable resin discharged from the shaping head.

4. The three-dimensional printing apparatus according to claim 3, wherein the lighting device is fitted to the shaping head.

5. The three-dimensional printing apparatus according to claim 1, wherein:

the scan head is fitted to the carriage mechanism; and the shaping head and the scan head move integrally with each other.

* * * * *